United States Patent [19]

Ikeda et al.

[11] Patent Number: 5,296,129
[45] Date of Patent: Mar. 22, 1994

[54] PARAFFIN WAX COMPOSITIONS AND RUBBER COMPOSITIONS INTO WHICH PARAFFIN WAX COMPOSITIONS ARE INCORPORATED

[75] Inventors: Nobumasa Ikeda; Masanori Tajima, both of Kodaira, Japan

[73] Assignee: Bridgestone Corporation, Tokyo, Japan

[21] Appl. No.: 798,952

[22] Filed: Nov. 27, 1991

[30] Foreign Application Priority Data

Nov. 30, 1990 [JP] Japan .................. 2-330606

[51] Int. Cl.$^5$ .................. C08L 91/06; C08K 5/01; C09K 15/00; C09K 15/04
[52] U.S. Cl. .................. 207/20; 208/21; 252/397; 252/399; 106/270; 106/285; 524/62; 524/487; 524/490
[58] Field of Search .................. 208/20, 21; 252/397, 252/399; 106/270, 285; 524/62, 487, 490

[56] References Cited

U.S. PATENT DOCUMENTS

| | | | |
|---|---|---|---|
| 2,615,856 | 10/1952 | Bloch | 524/490 |
| 2,779,745 | 1/1957 | Howland | 524/62 |
| 3,423,348 | 1/1989 | Eigenfeld et al. | 260/28.5 |
| 3,826,735 | 7/1974 | Shinomura | 106/270 |
| 3,838,080 | 9/1974 | Shinomura et al. | 524/490 |
| 3,856,731 | 12/1974 | Shinomura | 524/490 |
| 4,468,254 | 8/1984 | Yokoyama et al. | 524/62 |
| 4,877,456 | 10/1989 | Chikamune et al. | 106/270 |

FOREIGN PATENT DOCUMENTS

| | | |
|---|---|---|
| 2311965 | 9/1973 | Fed. Rep. of Germany . |
| 3840202 | 6/1989 | Fed. Rep. of Germany . |
| 54-25062 | 8/1979 | Japan . |
| 63-145346 | 6/1988 | Japan . |
| 1-230648 | 9/1989 | Japan . |

*Primary Examiner*—R. Bruce Breneman
*Assistant Examiner*—Patricia L. Hailey
*Attorney, Agent, or Firm*—Sughrue, Mion, Zinn, Macpeak & Seas

[57] ABSTRACT

A paraffin wax composition comprises straight-chain saturated hydrocarbons, wherein the content of each of the straight-chain hydrocarbons having the number of carbons being 22 to 44, respectively, is not less than 2% by weight relative to the entire straight-chain saturated hydrocarbons. A rubber composition is also disclosed, which comprises a rubber and this paraffin wax composition, wherein 1 to 10 parts by weight of the above paraffin wax composition is blended relative to 100 parts by weight of a diene rubber.

4 Claims, No Drawings

PARAFFIN WAX COMPOSITIONS AND RUBBER COMPOSITIONS INTO WHICH PARAFFIN WAX COMPOSITIONS ARE INCORPORATED

BACKGROUND OF THE INVENTION

1. Field of the Invention

The present invention relates to paraffin wax compositions which can prevent degradation of rubber articles with ozone and afford excellent appearance upon the rubber articles over a wide temperature range from a low temperature zone to a high temperature zone. The invention also relates to rubber compositions into which such paraffin wax compositions are incorporated.

2. Description of the Related Art

In order to prevent rubber from being cracked with air or sun light, it is formerly known that a wax-based antioxidant is used in rubber.

When the wax-based antioxidant is blended with rubber, the antioxidant oozes out onto the surface of rubber and forms a thin film thereon. This thin film prevents the rubber from contacting ozone, and thus prevents degradation thereof.

Although a variety of wax-based rubber antioxidants have been commercially available for a long time, the function of the antioxidant to ooze out and form a thin film and a phenomenon that the thin film once formed is peeled and dropped differ depending upon temperatures. Under the circumstances, in order to improve these problems, there are proposed antioxidants in which the number of the carbons of a wax-based rubber antioxidant is distributed over a wide range of 16-41 (U.S. Pat. No. 3,423,348) and antioxidants containing 25-70% by weight straight chain hydrocarbons having the number of carbons of 26-29 and 30-75% by weight straight chain hydrocarbons having the number of carbons of 34-40 (Japanese patent publication No. 54-25,062).

Japanese patent application Laid-open Nos. 48-91,141 and 63-145,346 disclose wax-based rubber antioxidants having a so-called two peak distribution consisting of greater amounts of wax components having the number of carbons of 26-29 and a wax component having the number of carbons of 34-40 and a smaller amount of a wax component having the number of carbons of 30-33.

Further, Japanese patent application Laid-open No. 1-230,648 discloses antioxidants capable of improving ozone resistance at relatively high temperatures by increasing the content of normal saturated hydrocarbons having the number of carbons of 36-51.

However, the above-mentioned conventional wax-based antioxidants all damage the appearance of rubber articles, and have poor ozone resistance at relatively low temperatures. Therefore, they are unsuitable for rubber compositions which are to be used under conditions of much ozone even at low temperatures and thus highly required to improve ozone resistance.

SUMMARY OF THE INVENTION

It is an object of the present invention to solve the above-mentioned problems, and to provide a wax-based antioxidant of a paraffin wax composition and a rubber composition including such a paraffin wax composition, which paraffin wax composition and rubber composition can favorably prevent deterioration with ozone under a stationary condition over a wide temperature range from relatively low temperatures to high temperatures, for example, over 0° C. to 60° C., is free from a wax-blooming phenomenon, and afford good appearance upon surface of rubber.

In order to solve the above-mentioned problem, the wax composition according to the present invention comprises straight-chain saturated hydrocarbons, wherein the content of each of the straight-chain saturated hydrocarbons having the number of carbons being 22 to 44, respectively, is not less than 2% by weight relative to the entire straight-chain saturated hydrocarbons.

The rubber composition according to the present invention is characterized in that 1 to 10 parts by weight of the above paraffin wax composition is blended relative to 100 parts by weight of a diene-based rubber.

According to the paraffin wax composition of the present invention, it is preferable that the content of each of the straight-chain saturated hydrocarbons having the number of carbons being 22 to 30, respectively, is not less than 4% by weight relative to the entire straight-chain saturated hydrocarbons.

Further, it is preferable that the content of the non-linear hydrocarbons having the number of carbons being 30 to 60 is 16% by weight to 30% by weight relative to the entire paraffin wax composition.

According to the rubber composition of the present invention, it is preferable that the content of each of the straight-chain saturated hydrocarbons having the number of carbons being 22 to 30, respectively, is not less than 4% by weight relative to the entire straight-chain saturated hydrocarbons.

Further, it is preferable in this rubber composition that the content of the non-linear hydrocarbons having the number of carbons being 30 to 60 is 16% by weight to 30% by weight relative to the entire paraffin wax composition.

The paraffin wax composition, which blooms over a wide range from low temperatures to high temperatures, exhibit effective ozone resistance and particularly effective stationary ozone resistance in use under conditions over a wide atmospheric temperature.

The paraffin wax composition according to the present invention complies with such requirements. When the content of each of the straight-chain saturated hydrocarbons having the number of carbons being 22 to 44 is not less than 2% by weight relative to the entire straight-chain saturated hydrocarbons, blooming of the wax can be maintained over a wide temperature range from low temperatures (e.g., 0° C.) to high temperatures (e.g. 60° C.), and excellent ozone resistance under stationary conditions can be also maintained.

In the paraffin wax composition according to the present invention, when the content of each of the straight-chain saturated hydrocarbons having the number of carbons being 22 to 30 is not less than 4% by weight relative to the entire straight-chain saturated hydrocarbons, the blooming speed of the wax becomes faster at a low temperature range (0° C.–30° C.). Further, even if the film of the wax is broken or cracked depending upon exterior stimulation conditions such as changes in temperature ranges and changes in strains, the film is speedily repaired, so that desirable ozone resistance can be exhibited.

On the other hand, if the content of the total straight-chain saturated hydrocarbons is too much, the antioxidant contained in the blended rubber composition blooms together with the blooming of the wax to change the appearance to blown with sun light or ultraviolet rays, although the initial stage ozone resistance under stationary conditions is good.

In view of this, in order to control the blooming speed of the wax particularly at high temperatures (30° C.-60° C.) and realize both prevention of deterioration of the appearance owing to the color change and maintenance of the function of the wax, the content of the non-linear hydrocarbons having the number of carbons being 30 to 60 is preferably 16 to 30% by weight relative to the entire paraffin wax composition.

The paraffin wax composition according to the present invention is called a microcrystal wax which contains the straight-chain saturated hydrocarbons called normal paraffin, isoparaffin (branched saturated hydrocarbons), naphthene (alicyclic hydrocarbons) as well as a small amount of an aromatic hydrocarbon.

These and other objects, features and advantages of the invention will be appreciated upon reading of the following description of the invention, with the understanding that some modifications, variations and changes of the same could be easily made by the skilled person in the art to which the invention pertains, without departing from the spirit of the invention or the scope of claims appended hereto.

DETAILED DESCRIPTION OF THE INVENTION

The diene-based rubber used in the rubber composition according to the present invention is a rubber polymer selected from the group consisting of natural rubber, polyisoprene rubber, polybutadiene rubber, styrene-butadiene copolymer rubber, isoprene-butadiene copolymer rubber, styrene-isoprene copolymer rubber, and styrene-butadiene-isoprene terpolymer rubber. These rubbers may be used singly or in a blended state.

In the rubber composition according to the present invention, if the blended amount of the paraffin wax composition is less than 1 part by weight relative to 100 parts by weight of the diene rubber, a blooming amount of the wax onto the surface of the rubber is so small that the function of the bloomed film is insufficient. On the other hand, the blended amount of the paraffin wax composition is unfavorably more than 10 parts by weight, because the blooming amount is too much and the appearance is deteriorated, and tenacity of the rubber is lowered.

A process for producing the paraffin wax composition according to the present invention is not limited to any specific process. For example, a desired paraffin wax composition may be obtained directly from a conventionally known petroleum-originated wax or synthesized wax by distillation. Alternatively, the paraffin wax composition of the invention may be obtained by blending an appropriate wax containing much straight-chain hydrocarbons having the number of carbons of 22 to 30 with another appropriate straight-chain hydrocarbons having the number of carbons of 31-44.

The paraffin wax composition of the present invention can be usually obtained by the following specific process. That is, a crude oil is distilled under ordinary pressure, oil in a bottom of a distillation tower is further distilled under reduced pressure; and an aromatic component is removed from a distilled oil by subjecting the distilled oil to extraction with a solvent such as phenol or furfural. Then, the oil is purified by hydroxylation, and is subjected to dewaxing with a solvent such as a ketone or an aromatic mixed solution. Thereby, a crude wax is obtained in the dewaxing step as a byproduct being produced when the dewaxed wax oil is obtained as a base oil for a lubricant. After that, a deoiled wax is obtained by removing a low melting point wax from the crude wax through deoiling the crude oil with a solvent. Alternatively, the deoiled wax may be obtained by deoiling the crude wax through sweating. The deoiled wax may be purified by treating it with sulfuric acid or white clay.

In order to separate a normal paraffin, for example, a method disclosed in Japanese patent application Laid-open Nos. 56-14,583, 56-15,218, and 56-15,219 may be employed.

The paraffin wax composition according to the present invention may be obtained as follows:

The deoiled wax obtained by the above-mentioned ordinary process is distilled to obtain a desired paraffin wax composition. Alternatively, a crude oil is appropriately selected as a starting material, and when an oil remaining on distillation under ordinary pressure is to be distilled under reduced pressure to obtain a distilled oil, the distillation is effected in such a narrow boiling point range that the hydrocarbons having the composition defined in the present invention may be substantially distilled out. Thereby, for example, a fraction containing hydrocarbons having the number of carbons of 22-30 and a fraction substantially containing hydrocarbons having the number of carbons of 31-44 are obtained, and the paraffin wax composition is obtained by mixing these fractions.

As the petroleum paraffin wax according to the present invention, a polyolefine obtained by polymerizing an olefine such as ethylene, a pyrolyzed polyolefine, or a wax synthesized by Hisshar-Tropis process or products obtained by further subjecting them to distillation or extraction to produce the composition including hydrocarbons having the given number of carbons may be used.

The composition of the paraffin wax composition was determined by a machine of capillary GC (tradename HP-5890) and a capillary column having a column coated with alumina (manufactured under tradename CBM-1 by Shimazu Manufacturing Co., Ltd., 25 m length) in the state that helium was flown as a carrier gas at a flow rate of 4 mm/min., and the temperature and the heating rate of the column were set at 180° C. to 390° C. and 15° C./min., respectively.

EXPERIMENTS

The present invention will be explained in more detail with reference to specific examples and comparative examples.

Eight kinds of paraffin wax compositions shown in Table 1 were used, and sixteen kinds of rubber compositions were kneaded according to the compounding recipes shown in Tables 2 and 3 in terms of parts by weight. Then, a rubber sheet was obtained by vulcanizing each of the kneaded mixtures at 155° C. for 30 minutes. The characteristics of the thus obtained rubber sheets were examined by the following ways.

OZONE RESISTANCE

Each of the sixteen kinds of the thus obtained rubber sheets as test pieces was held by an expanding holder, and appearance of the rubber sheet was examined by visually observing a crack-occurred percentage after the rubber sheet was allowed to be left in an ozone weather meter at an ozone concentration of 100 pphm in a stationary condition for 72 hours (i) under an expanded percentage of 50% at a temperature of 5° C. or (ii) under an expanded percentage of 30% at a temperature of 60° C.

APPEARANCE

Appearance of the rubber was evaluated by three steps through visually evaluating each test piece which had been allowed to be left in a thermostat vessel at a temperature of 50° C. for one week. "Good", "acceptable" and "bad" in Tables 2 and 3 denote the test piece of which the surface did not become whitish, the test piece of which the surface became slightly whitish, and the test piece of which the surface become conspicuously whitish to remarkably deteriorate the appearance, respectively.

In Table 2, the appearance was relatively evaluated by index by taking an index of the rubber composition in Comparative Example 1 and the state completely free from occurrence of cracks as 100 and 0, respectively.

In Table 3, the appearance was similarly relatively evaluated by index by taking the index of the rubber composition in Comparative Example 1.

TABLE 1

| Petroleum wax | Wax composition of the invention | | | | | | Comparative wax composition | |
|---|---|---|---|---|---|---|---|---|
| | A | B | C | D | E | F | G | H |
| Distribution of respective contents (wt %) of $C_{22}$–$C_{30}$ straight-chain saturated hydrocarbons relative to all straight-chain hydrocarbons | 4.3~4.8 | 4.7~5.4 | 4.1~4.5 | 4.6~5.7 | 4.2~4.9 | 3.1~3.6 | 1.4~3.1 | 1.3~3.5 |
| Distribution of respective contents (wt %) of $C_{31}$–$C_{44}$ straight-chain saturated hydrocarbons relative to all straight-chain hydrocarbons | 2.4~4.2 | 2.1~4.5 | 2.2~4.1 | 2.3~4.5 | 2.1~4.1 | 2.7~3.5 | 2.4~4.8 | 1.1~3.3 |
| Content (wt %) of $C_{30}$–$C_{60}$ straight-chain saturated hydrocarbons relative to entire paraffin wax composition | 22 | 16 | 30 | 12 | 43 | 23 | 13 | 41 |
| Content (wt %) of $C_{22}$–$C_{44}$ straight-chain saturated hydrocarbons relative to entire straight-chain saturated hydrocarbons | 79.7 | 83.5 | 75.8 | 82.6 | 74.9 | 74.1 | 72.5 | 52.4 |

TABLE 2

| | | Example 1 | Example 2 | Example 3 | Example 4 | Example 5 | Example 6 | Comparative Example 1 | Comparative Example 2 |
|---|---|---|---|---|---|---|---|---|---|
| Rubber composition | natural rubber | 80 | 80 | 80 | 80 | 80 | 80 | 80 | 80 |
| | polypropylene (IR2200) | 20 | 20 | 20 | 20 | 20 | 20 | 20 | 20 |
| | carbon black HAF | 45 | 45 | 45 | 45 | 45 | 45 | 45 | 45 |
| | aromatic oil | 5 | 5 | 5 | 5 | 5 | 5 | 5 | 5 |
| | paraffin wax composition | | | | | | | | |
| | (kind) | A | B | C | D | E | F | G | H |
| | (amount) | 2 | 2 | 2 | 2 | 2 | 2 | 2 | 2 |
| | stearic acid | 2 | 2 | 2 | 2 | 2 | 2 | 2 | 2 |
| | zinc oxide | 3 | 3 | 3 | 3 | 3 | 3 | 3 | 3 |
| | antioxidant (Santoflex 13) | 1 | 1 | 1 | 1 | 1 | 1 | 1 | 1 |
| | vulcanization accelerator CZ | 1 | 1 | 1 | 1 | 1 | 1 | 1 | 1 |
| | sulfur | 1.5 | 1.5 | 1.5 | 1.5 | 1.5 | 1.5 | 1.5 | 1.5 |
| Evaluation results | stationary ozone resistance 5° C. | 0 | 0 | 0 | 0 | 40 | 0 | 100 | 140 |
| | stationary ozone resistance 60° C. | 20 | 20 | 30 | 20 | 40 | 30 | 100 | 120 |
| | rubber surface appearance 50° C. | acceptable | acceptable | acceptable | acceptable | acceptable | acceptable | bad | acceptable |

TABLE 3

| | | Example 7 | Example 8 | Example 9 | Example 10 | Example 11 | Example 12 | Comparative Example 3 | Comparative Example 4 |
|---|---|---|---|---|---|---|---|---|---|
| Rubber composition | natural rubber | 50 | 50 | 50 | 50 | 50 | 50 | 50 | 50 |
| | polypropylene (IR2200) | 50 | 50 | 50 | 50 | 50 | 50 | 50 | 50 |
| | carbon black HAF | 50 | 50 | 50 | 50 | 50 | 50 | 50 | 50 |
| | aromatic oil | 10 | 10 | 10 | 10 | 10 | 10 | 10 | 10 |
| | paraffin wax composition | | | | | | | | |
| | (kind) | A | B | C | D | E | F | G | H |
| | (amount) | 8 | 8 | 8 | 8 | 8 | 8 | 8 | 8 |

TABLE 3-continued

|  |  | Example 7 | Example 8 | Example 9 | Example 10 | Example 11 | Example 12 | Comparative Example 3 | Comparative Example 4 |
|---|---|---|---|---|---|---|---|---|---|
|  | stearic acid | 2 | 2 | 2 | 2 | 2 | 2 | 2 | 2 |
|  | zinc oxide | 3 | 3 | 3 | 3 | 3 | 3 | 3 | 3 |
|  | antioxidant (Santoflex 13) | 3 | 3 | 3 | 3 | 3 | 3 | 3 | 3 |
|  | vulcanization accelerator CZ | 0.8 | 0.8 | 0.8 | 0.8 | 0.8 | 0.8 | 0.8 | 0.8 |
|  | sulfur | 1.3 | 1.3 | 1.3 | 1.3 | 1.3 | 1.3 | 1.3 | 1.3 |
| Evaluation result | stationary ozone resistance 5° C. | 0 | 0 | 0 | 0 | 0 | 0 | 100 | 120 |
|  | stationary ozone resistance 60° C. | 0 | 0 | 10 | 0 | 20 | 0 | 100 | 120 |
|  | rubber surface appearance 50° C. | acceptable | acceptable | acceptable | bad | acceptable | acceptable | bad | acceptable |

As is seen from Tables 1, 2 and 3, the rubber compositions according to the present invention exhibited excellent ozone resistance both at the low and high temperatures (5° C. and 60° C.) as compared with Comparative Examples which did not contain the paraffin wax compositions defined in the present invention.

As having been explained above, according to the present invention, the contents of the straight-chain saturated hydrocarbons having the specified numbers of carbons are set at the specific ranges, respectively. Thereby, the rubber compositions into which a given amount of such paraffin wax compositions is incorporated can prevent deterioration of the rubber articles with ozone in the stationary condition over a wide range from the low temperatures to the high temperatures, and exhibit excellent effect upon the appearance.

What is claimed is:

1. A paraffin wax composition comprising straight-chain saturated hydrocarbons,
   wherein the content of each of the straight-chain saturated hydrocarbons having 31 to 44 carbon atoms, respectively, is not less than 2% by weight and the total amount of straight-chain saturated hydrocarbons having 31–44 carbon atoms is at least 28%,
   and further wherein the content of each of the straight-chain saturated hydrocarbons having 22 to 30 carbon atoms, respectively, is not less than 4% by weight, and the total amount of straight-chain saturated hydrocarbons having 22 to 30 carbon atoms is at least 36%, relative to the entire straight-chain saturated hydrocarbons.

2. The paraffin wax composition according to claim 1, wherein non-linear hydrocarbons having 30 to 60 carbon atoms, are present in an amount of 16 to 30% by weight relative to the entire paraffin wax composition.

3. A rubber composition comprising a diene rubber and a paraffin wax composition, said paraffin wax composition comprising straight-chain saturated hydrocarbons,
   in which the content of each of the straight-chain saturated hydrocarbons having 31 to 44 carbon atoms, respectively, is not less than 2% by weight, and the total amount of straight-chain saturated hydrocarbons having 31–44 carbon atoms is at least 28%,
   and further in which the content of each of the straight-chain saturated hydrocarbons having 22 to 30 carbon atoms, respectively, is not less than 4% by weight, and the total amount of straight-chain saturated hydrocarbons, having 22 to 30 carbon atoms is at least 36, relative to the entire straight-chain saturated hydrocarbons, wherein 1 to 10 parts by weight of the above paraffin wax composition is blended relative to 100 parts by weight of said diene rubber.

4. The rubber composition according to claim 3, wherein non-linear hydrocarbons having 30 to 60 carbon atoms are present in an amount of 16 to 30% by weight relative to the entire paraffin wax composition.

* * * * *